UNITED STATES PATENT OFFICE.

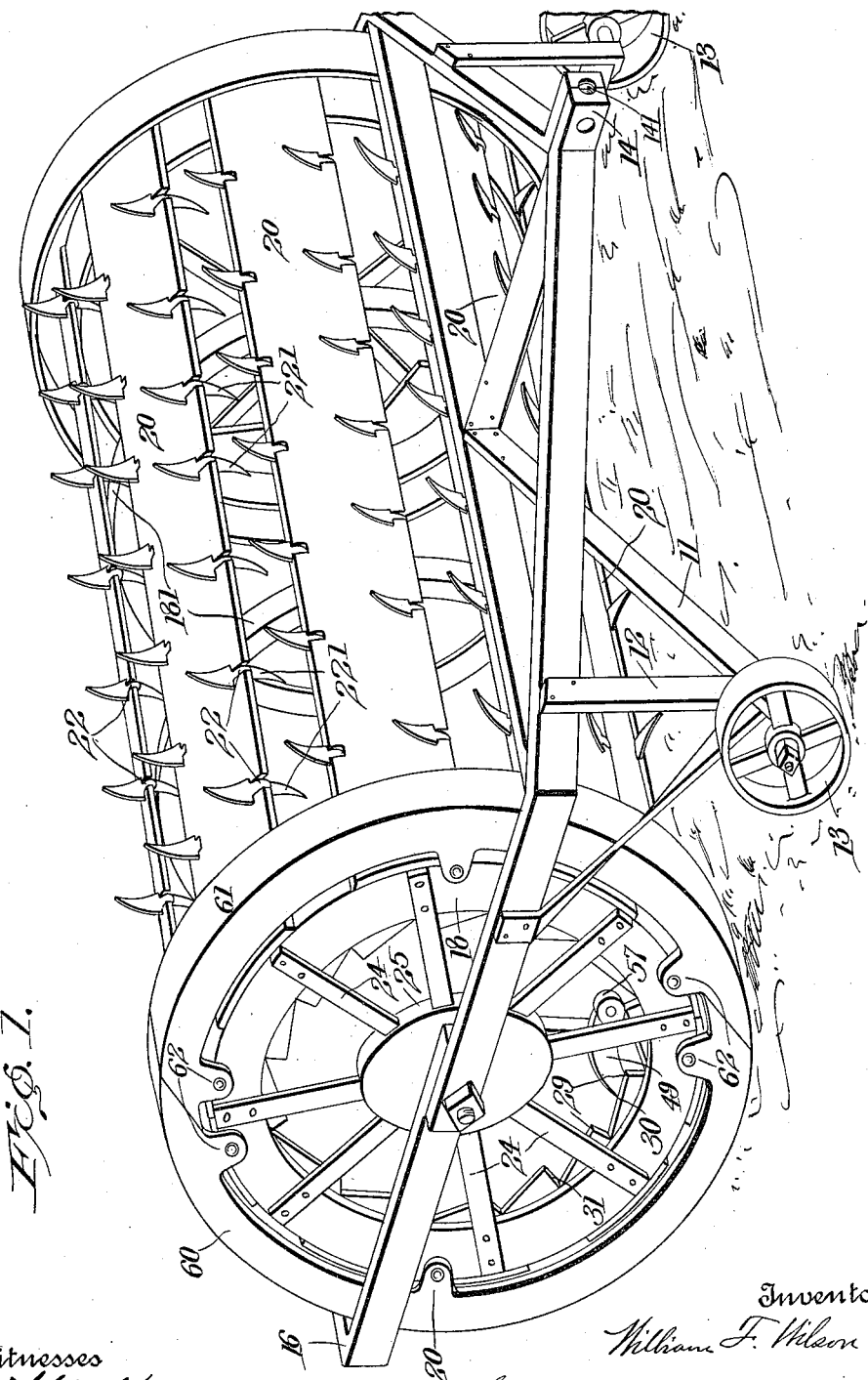

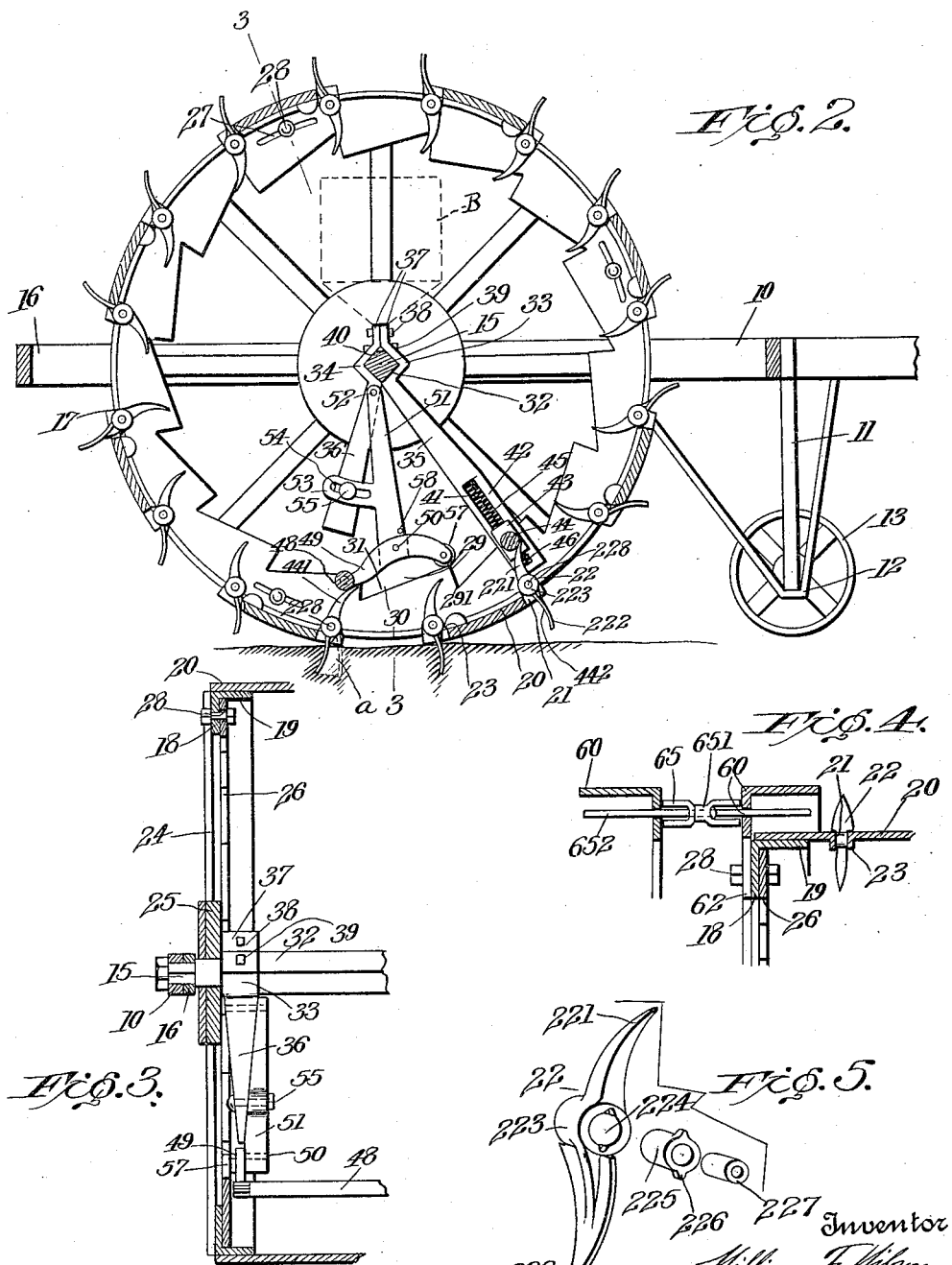

WILLIAM FRANKLIN WILSON, OF MOLALLA, OREGON.

GRAIN-TILLER.

1,174,921.              Specification of Letters Patent.      Patented Mar. 7, 1916.

Application filed September 20, 1915. Serial No. 51,679.

*To all whom it may concern:*

Be it known that I, WILLIAM F. WILSON, a citizen of the United States, and resident of Molalla, county of Clackamas, State of Oregon, have invented certain new and useful Improvements in Grain-Tillers, of which the following is a specification.

This invention relates to cultivating implements and more particularly to a device for tilling grain.

The principal object of the grain tiller described herein is to break the ground in which the grain has been sown when it becomes packed or crusted. In case there has been much freezing and thawing, the ground in which the grain has been planted, fall sown grain for instance, becomes hard and crusted and it is the purpose of this invention to provide a tiller that will break this crust without danger to the roots of the grain and without up-rooting it.

Another object of the invention is to provide a machine which is simple in construction and which may be easily moved from place to place.

The above and other objects and the novel features of the invention will be apparent from the following description taken in connection with the drawings, in which:

Figure 1 is a perspective view of a grain tiller embodying my invention. Fig. 2 is a sectional view taken transversely of the cylindrical frame which carries the ground breaking teeth. Fig. 3 is a cross sectional view of one end of the machine taken on the line 3—3 of Fig. 2. Fig. 4 is a detail sectional view. Fig. 5 is a perspective view of one of the teeth and the bearing sleeves therefor.

Referring to the drawing, 10 designates the forward part of a substantially horizontal iron draft frame which has bracing members 11 and brackets 12 which rotatably support the truck wheels 13 at the front end of the machine. The draft animals or other drawing means may be attached to the front end 14 of the frame 10. The said members of the horizontal frame 10 are spaced apart and support a non-rotatable shaft 15 between them and at the rear there is another frame member 16 extending behind the tilling cylinder 17, the rear frame member 16 being also mounted at its front end on the shaft 15.

The cylindrical frame 17 comprises a pair of annular end members 18 having rim flanges 19 to which a plurality of curved plates 20 are secured, the spaced plates 20 forming the cylindrical outer surface of the frame 17. Between the end members 18 and on the inner sides of the plates 20, there are bracing rings 181 which provide a more rigid cylinder. The plates 20 have recesses 21 along their longitudinal edges to receive the teeth 22 which are pivotally mounted in ears 23 on the inner sides of the plates 20 and on opposite sides of the recesses 21.

Each tooth 22, as shown in Fig. 5 consists of a curved inner end 221 joined to a curved outer end 222 by the central hub 223. The hub 223 is enlarged and has a bore 224 to receive the bearing sleeve 225 which is provided with lugs 226 to keep it from turning. Another sleeve 227 is inclosed within the sleeve 225 and a pivot bolt 228 extends through the ears 23 and sleeve 227 to pivotally support the tooth 22 on the plate 20. The means for pivoting the teeth on the plates 20 serves to prevent excessive wear of the hub 223 of the teeth, because the only parts subject to wear on account of the pivotal support are the two sleeves and the pivot pin. It is impossible to keep these parts of the device oiled and consequently there would be an excessive wear at these points on account of the dust sifting in and it will be only necessary to renew the sleeves when they are worn out and the hub of the tooth will not be subject to wear. The outer ends 221 of the teeth are heavier than the outer ends 222 thereof.

The annular end members 18 are connected by spokes 24 to a hub 25 which is rotatably mounted on a cylindrical part of the stationary shaft 15, the spokes 24 being fastened at their outer ends to the annular member 18. Each of the annular members 18 carries a circular rack member 26, the rim of which is provided with slots 27 to receive bolts 28 in holes in the annular member 18. The two parts 18 and 26 connected by this bolt and slot connection, being thus adjustable relatively to one another circumferentially. The member 26 is located within the rim of flange 19 on the member 18 and on its inner edge has a circular series of teeth 29 formed by inclines 30 and 31, the purpose of which will be set forth later.

The shaft 15 has an angular portion 32 to fit corresponding portions 33 and 34 on the radially extending arms 35 and 36 respectively. The parts 33 and 34 on the arms 35 and 36 together completely surround the square or angular portion 32 of the shaft 15 and have corresponding upwardly extending projections 37 which are secured together by bolts 38 and 39, the bolt 39 extending across the edge of the shaft through a groove 40 to keep the parts from moving longitudinally of the shaft. There are two arms 35, one at each end of the shaft 15 and extending forwardly therefrom toward the truck end of the machine. Each arm 35 has a recess 41 therein which is closed at the top by a plate 42. The recess 41 constitutes a guide for the boxing 43 at the end of a round bar 44 which extends longitudinally of the cylinder and substantially parallel to the shaft 15. The box 43 is held between the springs 45 and 46 seated in the recess 41 on opposite sides of the box 43 and yieldingly holding the same in place. The bar 44 is supported at a point in the lower front side of the machine where it will engage the inner end 221 of the teeth 22 as they pass and turn them so that the outer ends 222 thereof will be in a substantially normal position to the surface of the earth when they begin to enter it and the further movement of the machine will force the teeth down into the ground. The inner end 221 has a curved forward face which engages the curved surface of the round bar 44 and they slide along each other until the outer ends 222 of the teeth enter the ground. The outer ends 222 of the teeth have curved concave or shovel-like faces 442 adapted to open the earth and adapted to be readily withdrawn from the opening as will be set forth later. When the teeth 22 reach the bar 44 and engage it, the latter being yieldingly supported by the spring 45 will rise in the recess 41 slightly so that the teeth will not be broken by the impact with the bar. The spring 45 will restore the bar to its normal position and the lower spring 46 will yieldingly support it at the bottom. The bar may also give a slight amount when the inner ends of the teeth 22 pass under it.

As the successive rows of teeth move downwardly and rearwardly, the faces 441 of the inner ends 221 thereof are engaged by a round bar 48 which is mounted at its ends in the arms 49 pivoted intermediate their ends at 50 at the lower ends of hangers 51. The hangers 51 are pivoted at 52 to the rear arms 36 and between the pivots 50 and 52 are provided with rearwardly extending lugs 53 having slots 54 which receive set-screws 55 on the arms 36 and locking the hangers 51 in adjusted position with respect to the arms 36. It will be understood that when the faces 441 of the teeth engage the bar 48 they will be rocked on their pivots 228 and the lower or outer ends 222 thereof which extend into the ground will be rocked a slight amount to open up the ground as at $a$, whereby the earth will be broken at a number of places. The devices are adjusted so that at the moment that the opening $a$ is made, the bar 48 will be made to rise and release the upper ends 221 of the teeth in that particular row so that they may be withdrawn as the frame rolls on, without up-rooting the grain. In order to raise and lower the arms 49 and the bar 48 carried thereby, each of the arms 49 has a roller 57 mounted adjacent its end on the opposite side of the pivot 50 from the bar 48. The roller 57 moves along the rack on the bar 26 and over the tooth 29 thereon. It will be seen that when the rollers 57 rest on the peaks of the teeth the bar 48 will be in its lowermost position and in engagement with a row of teeth and when the rollers 57 drop into the grooves 291 the bar 48 will be raised to its highest position and the inner ends of the teeth 221 will then be released so that the teeth may swing about their pivots and so that they may be withdrawn without injury to the grain. A stop pin 58 is provided on the hanger 51 to limit the movement of the arms 49 and prevent the bar 48 from dropping too far down.

In order to easily move the machine from place to place, I provide a pair of wheel members each of which is made in two halves 60 and 61 which are secured together and form a flanged annular member. The annular member is provided with inwardly extending lugs 62 which may be secured to the end member 18 of the cylindrical frame 17 and will support that frame a sufficient distance from the ground to keep the teeth thereon from touching the ground, see Fig. 4. This arrangement will protect the teeth on hard ground and provide a means for moving the device about and when the same is at the place where it is to be used, the halves 60 and 61 may be readily detached from the ends of the cylinder and the latter then rests on the teeth which are in position for operation.

It will be understood that the machine may be built or used in as many sections as desired. Each section preferably is made about five feet wide and by using a machine with three sections, a suitable width may be cultivated. In Fig. 4, I have illustrated a swivel clevis 65 by means of which two sections of the machine may be fastened together, the clevis has a member 651 through which the connecting bolt 652 may pass and this is for the purpose of holding a frame rigid so that the sections of the machine cannot run together in crossing furrows or low places.

In case the machine is not heavy enough to force the teeth into the ground, a box is mounted on the axle 15 between the ends thereof, as shown in dotted lines at B in Fig. 2. The box B is for the purpose of carrying additional weights.

While I have herein shown and described my invention in detail, it is to be understood that I do not wish to be limited to the exact details disclosed, as numerous minor changes may be made without departing from the spirit of the invention.

Having thus described my invention, what I claim and desire to secure by Letters Patent is:

1. In a machine of the class described, the combination of a frame, a row of ground breaking members pivoted thereon, said ground breaking members being movable independently of the frame, means for engaging said members to hold them in position for parts thereof to enter the ground, and means for rocking said members a slight amount while said parts thereof are in the ground, so as to break the ground, said members being released by said moving means before said parts leave the ground.

2. In a machine of the class described, the combination of a frame, a plurality of rows of pivoted ground breaking members carried thereby, means for engaging said members to hold them in a fixed position to enter the ground, and means for rocking said members a slight amount while they are in the ground and releasing said members before they leave the ground.

3. In a machine of the class described, the combination of a substantially cylindrical frame adapted to be rolled on the ground, a plurality of rows of teeth pivoted substantially in the peripheral surface of said cylindrical frame and having portions adapted to project outside the cylindrical frame and portions adapted to project inside the cylindrical frame, means for engaging the inner ends of said teeth to hold the outer ends thereof in position to enter the ground, and means for engaging the inner ends of the teeth to rock the outer ends a slight amount while they are in the ground, so as to break the ground, said inner ends being released by said engaging means while the outer ends of the teeth are still in the ground.

4. In a machine of the class described, the combination of a substantially cylindrical frame adapted to be rolled on the ground, a plurality of rows of teeth pivoted substantially in the peripheral surface of said cylindrical frame and having portions adapted to project outside the cylindrical frame and portions adapted to project inside the cylindrical frame, a bar yieldingly mounted on the interior of said cylindrical frame and capable of engaging the inner ends of the teeth to turn them and hold them in position to enter the ground and means engaging said teeth while they are in the ground to move them a slight amount, so as to break the ground.

5. In a machine of the class described, the combination of a substantially cylindrical frame adapted to be rolled on the ground, a plurality of rows of teeth pivoted substantially in the peripheral surface of said cylindrical frame and having portions adapted to project outside the cylindrical frame and portions adapted to project inside the cylindrical frame, a bar yieldingly mounted on the interior of said cylindrical frame and capable of engaging the inner ends of the teeth to turn them and hold them in position to enter the ground, and a yieldingly supported bar capable of engaging the inner ends of said teeth so as to rock them on their pivots while they are in the ground to break the ground.

6. In a machine of the class described, the combination of a substantially cylindrical frame capable of being rolled over the ground, a plurality of rows of movable ground breaking members thereon projecting outside the said frame and adapted to enter the ground as the frame rolls over it, and pivoted means mounted on the inside of said frame for moving the outer ends of said ground breaking members a slight amount while they are in the ground, so as to break the ground.

7. In a grain tiller, the combination of a substantially cylindrical frame adapted to be rolled over the ground, a plurality of movably mounted ground breaking members mounted in the peripheral surface of said frame and having ends projecting outside thereof and adapted to enter the ground, and a yieldingly mounted device on the inside of said frame capable of engaging the inner ends of said ground breaking members to position them so they will enter the ground, said device yielding so as to allow the inner ends of the ground breaking members to pass it.

8. In a grain tiller, the combination of a substantially cylindrical frame adapted to be rolled over the ground, a plurality of pivotally mounted ground breaking members carried by said frame and having outer ends adapted to enter the ground as the frame rolls over it, said ground breaking members having parts thereof extending inside said frame, and a yieldable device engaging the parts of said ground breaking members extending into the frame and adapted to operate said members so that the outer ends thereof will be moved a slight amount while they are in the ground, so as to break the ground.

9. In a grain tiller, the combination of a substantially cylindrical frame adapted to be roller over the ground, a plurality of movably mounted ground breaking members carried by said frame and having outer ends adapted to enter the ground as the frame rolls over it, said ground breaking members having parts thereof extending inside said frame, a pivoted device on the inside of said frame adapted to engage the inner ends of said members to move their outer ends a slight amount while they are in the ground, so as to break the ground, and means on the frame to rock said device on its pivot to successively release said members so that the outer ends thereof will be withdrawn from the ground without up-rooting the grain.

10. In a grain tiller, the combination of a substantially cylindrical frame adapted to be rolled over the ground, a plurality of movable ground breaking members carried by said frame and having outer ends adapted to project outside the cylindrical frame and into the ground as the frame is moved over it, means for positioning said members so that they will enter the ground, means for engaging the ends of said members within the frame to operate said members to cause the ends of the members in the ground to break the ground, and means whereby said engaging means is released so that said members will be withdrawn from the ground without up-rooting the grain as the machine moves over the ground.

11. In a machine of the class described, the combination of a substantially cylindrical frame having annular members at the ends thereof, ground breaking members on said frame, a draft frame, a shaft mounted on said draft frame and supporting said cylindrical frame, and wheel members capable of supporting said cylindrical frame and the ground breaking members thereon out of contact with the ground, each of said wheel members being angular in shape, providing a flange serving as a tread of the wheel member, each wheel member also being made of complementary parts and provided with ears whereby it may be readily attached to and detached from a part of the cylindrical frame.

12. In a machine of the class described, the combination of a substantially cylindrical frame having annular members at the ends thereof, ground breaking members on said frame, a draft frame, a stationary shaft fixed in said draft frame and rotatably supporting said cylindrical frame, and wheel members fitting said annular ends of the cylindrical frame and detachably connected thereto and capable of supporting said cylindrical frame and the ground breaking members thereon out of contact with the ground, each wheel member providing a continuous rim and being made of complementary parts which are readily attachable to and detachable from the annular members at the ends of the cylindrical frame.

13. In a machine of the class described, the combination of a non-rotatable supporting shaft, a substantially cylindrical frame rotatably supported thereon, a plurality of independently movable ground breaking devices on said frame and having parts adapted to project outside said frame and into the ground over which the frame rolls, a yieldingly mounted member carried by said shaft and adapted to engage and position said ground breaking members immediately before they engage the ground so that the outer ends thereof will be in proper position, a device adapted to engage said members while they are in the ground and move them slightly so as to break the ground and means whereby said device successively moves out of engagement with said members so that the latter may be withdrawn from the ground without up-rooting the grain.

14. In a grain tiller, the combination of a non-rotatable shaft, means for supporting said shaft, a substantially cylindrical frame rotatably mounted on said shaft and adapted to roll over the ground, a plurality of ground breaking members pivotally mounted on said frame and having ends thereof projecting outside of said frame and adapted to enter the ground, said members also having ends disposed inside said frame, arms secured to said shaft, a bar yieldingly mounted on said arms and adapted to engage the inner ends of said members to position them before they enter the ground, other arms mounted on said shaft, a device pivotally supported on said other arms and having a part adapted to engage the inner ends of said members while the outer ends thereof are in the ground to rock them on their pivots and break the ground, and means whereby said device is rocked on its pivotal support to successively move it out of engagement with the inner ends of said members so that the latter may be withdrawn from the ground without up-rooting the grain.

15. In a grain tiller, the combination of a truck, a truck frame connected thereto, a non-rotatable shaft mounted in said truck frame, a substantially cylindrical frame rotatably supported by said shaft and comprising annular ends, and plates connecting said annular ends, teeth pivoted at the edges of each of said plates and having ends extending outside said cylindrical frame and ends extending inside said cylindrical frame, a pair of front arms fixed on said shaft, a bar yieldingly mounted in said front arms and extending substantially parallel to said shaft and adapted to engage the inner ends of said teeth to position the outer ends thereof before they enter the ground, a pair of rear arms fixed to said shaft, a bar pivotally and adjustably mounted on said rear arms and adapted to engage the inner ends of said teeth and rock them slightly while the outer ends thereof are in the ground so as to break the ground, a roller on said pivotally mounted bar, and a rack on the inside of said frame and on which said roller travels, whereby said pivotally mounted bar is raised and lowered to alternately move out of engagement with said teeth as they leave the ground so that they will be withdrawn from the ground without up-rooting the grain.

In testimony whereof I affix my signature.

WILLIAM FRANKLIN WILSON.

Copies of this patent may be obtained for five cents each, by addressing the "Commissioner of Patents, Washington, D. C."